United States Patent
Widell et al.

(10) Patent No.: US 6,600,926 B1
(45) Date of Patent: Jul. 29, 2003

(54) CHANNEL SIMULATOR FOR MOBILE SYSTEMS

(75) Inventors: Svante Widell, Nynashamn (SE); Mats Olof Winroth, Poing (DE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/509,570

(22) PCT Filed: Oct. 16, 1998

(86) PCT No.: PCT/SE98/01856

§ 371 (c)(1),
(2), (4) Date: Sep. 15, 2000

(87) PCT Pub. No.: WO99/21305

PCT Pub. Date: Apr. 29, 1999

(30) Foreign Application Priority Data

Oct. 21, 1997 (SE) ............................................... 9703827

(51) Int. Cl.[7] .............................................. H04Q 7/20
(52) U.S. Cl. ...................... 455/446; 455/453; 455/455; 455/65; 455/504; 455/506; 375/132; 375/133; 375/135; 375/136
(58) Field of Search ................................ 455/446, 506, 455/453, 65, 504; 375/132, 133, 232, 229, 135, 150, 151, 152, 231, 233, 340, 347, 136

(56) References Cited

U.S. PATENT DOCUMENTS

| | | | | |
|---|---|---|---|---|
| 4,105,958 A | | 8/1978 | Pierce et al. | |
| 4,658,436 A | * | 4/1987 | Hill | 380/31 |
| 4,737,928 A | | 4/1988 | Parl et al. | |
| 4,947,073 A | | 8/1990 | Stokes et al. | |
| 5,191,594 A | * | 3/1993 | Argo et al. | 375/130 |
| 5,614,905 A | | 3/1997 | Crane | |
| 5,943,362 A | * | 8/1999 | Saito | 370/342 |
| 5,946,350 A | * | 8/1999 | Uesugi | 375/231 |
| 6,047,023 A | * | 4/2000 | Arnstein | 370/280 |
| 6,115,427 A | * | 9/2000 | Calderbank et al. | 375/240 |
| 6,134,280 A | * | 10/2000 | Matui | 375/341 |
| 6,151,487 A | * | 11/2000 | Kim et al. | 455/134 |

FOREIGN PATENT DOCUMENTS

WO    WO 93/20626    10/1993

* cited by examiner

*Primary Examiner*—Lee Nguyen
*Assistant Examiner*—Marceau Milord
(74) *Attorney, Agent, or Firm*—Oblon, Spivak, McClelland, Maier & Neustadt, P.C.

(57) ABSTRACT

A device and a method at a mobile communication system which provide a flexible and realistic way of emulating the time dispersive qualities and the broadband frequency correlation qualities of a radio channel. The device includes two or more flexible delay modules, and each module is arranged to emulate a tap and a continuously varying tap attenuation can be attained to describe the variation of the radio channel over the time. The modules may be realized in SAW-technology, and continuously varying tap attenuation may be achieved by the utilization of PIN-diode attenuators.

12 Claims, 1 Drawing Sheet

CHANNEL SIMULATOR FOR MOBILE SYSTEMS

BACKGROUND OF THE INVENTION

1. Field of the Invention

The present invention relates to a device and a method for channel simulation in a mobile communications system.

2. Discussion of the Background

At technical tests of mobile radio equipment, channel simulators (channel modulators) are used to emulate a realistic mobile radio channel under controlled forms. By means of a channel simulator, radio network functions such as handover, power control, and frequency hopping can be tested before they are used on a larger scale in the network.

The radio network function frequency hopping can be used in mobile communications systems in order to improve transmission performance by diversity gains for two differents disturbance causes. One quality of frequency hopping is interference diversity which may result in improvements in loaded networks. The other quality is generally called frequency diversity, and emanates from that the fading of the radio channel is not constant all over the system bandwidth. Frequency hopping is specified in GSM as an optional network function, i.e. the operator himself/herself decides if and when it shall be used. All mobile terminals, however, shall be able to cope with frequency hopping.

In the GSM specification there are channel models for type tests and evaluation, so called profiles, defined.

These profiles are designed in COST 207, and consist of a number, 6 or 12, discrete taps (so called "tapped delay line"-model) which fade independent of WSSUS (Wide Sense Stationary Uncorrelated Scattering). With tap here is referred to a signal path with defined fixed delay and average attenuation. The taps together constitute a model for the impulse response of the channels.

Channel simulators designed according to this type of channel model emulate the time dispersion of the channels very well for a system of medium data rate, type GSM. For real mobile radio channels, however, the strongest signals in the impulse response, which is modelled here by discrete taps, will vary. The degree of variation depends on environment and speed. The fixed taps according to COST 207 constitute a static model, which results in that the characteristics with regard to the frequency correlation is not modelled in a correct way. The frequency correlation in its turn decides which frequency diversity that is attained.

With that it is not possible to, in a realistic way, test frequency hopping with channel simulators which use such a fixed "tapped delay line"-structure.

The aim of the present invention consequently is to solve this problem and produce a channel simulator which in a realistic way can test frequency hopping.

To find out whether the prior art has solved this problem, a preliminary investigation was carried out, at which the following documents were found:

WO,A1,93/20626 describes a fading simulator where the input signal is led into FIR filter blocks connected in series, where the filter coefficients vary in time. See above all FIG. 3.

U.S. Pat. No. 4,105,958 relates to a channel simulator which makes use of two or more cascade connected delay lines with a plurality of taps to simulate channels with large dispersion of the time delays.

These documents, however, are impaired by the same statical model as the above described COST 207-model.

SUMMARY OF THE INVENTION

The above mentioned aim is attained by a device and a method which is described in the independent patent claims 1 respective 11.

The invention reveals a plurality of important advantages compared with known technology.

An example of such an advantage is the possibility to vary the time delay of the taps, which gives a unique uninterruptible channel, in contrast to present static technology. This gives a realistic picture of the slowly varying broadband channel qualities. By the invention it consequently will be possible to estimate performance of frequency hopping systems.

Present channel simulation technology gives the channel a constant attenuation per tap, leaving the rapid fading out of account. By the invention is made possible continuously varying tap attenuation, which imitates the shadow fading qualities of the channel.

Present channel simulation technology gives the channel a constant emulated speed. By the invention the mobile speed, and to that belonging parameters, can be varied during emulation.

The realization of the delay modules in SAW-technology and with PIN-diode attenuators, which is described in the dependent patent claims, is unique. This technology combines full controllability and flexibility with uninterruptability.

Further characteristics of the invention are given in the dependent patent claims.

BRIEF DESCRIPTION OF THE DRAWING

In the following a detailed description of an embodiment of the invention is given with reference to the only FIG.

DESCRIPTION OF THE PREFERRED EMBODIMENTS

Figure 1:
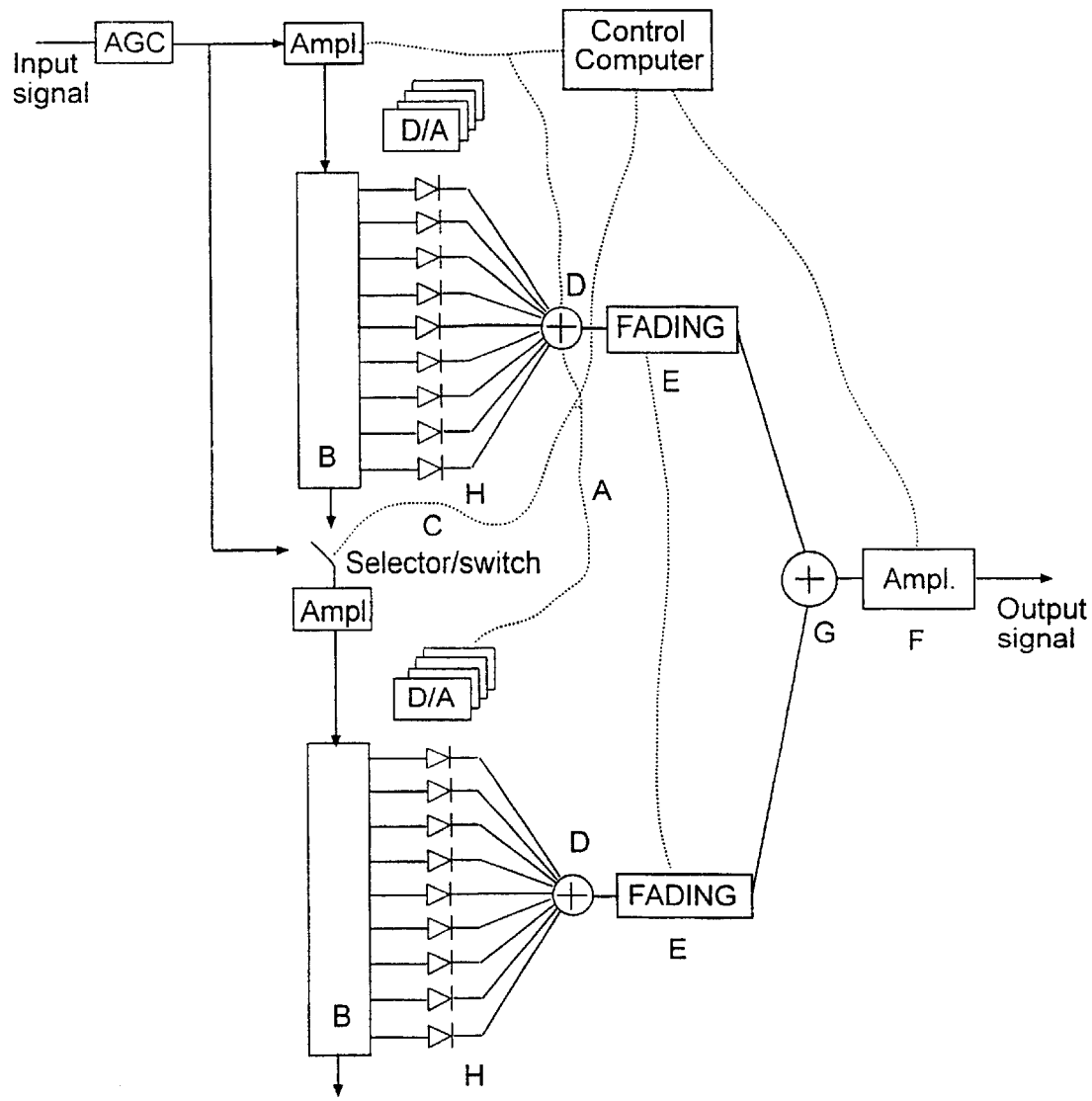
FIG. 1 illustrates schematically the channel simulator according to the present invention.

In the following description is referred to FIG. 1. FIG. 1 illustrates two delay modules B which emulate either two taps with the same delay span, or two taps where the delay modules B are connected in series to attain increased time delay in one of the taps. The amplifiers at the input of the delay modules B compensate for attenuation in these. The number of necessary outputs from the delay modules is rather large.

It should be realized that just any number of delay modules can be utilized in the channel simulator.

The invention consists of a channel simulator for mobile communications systems (for instance GSM) which in a flexible and realistic way both emulates the time dispersive qualities and the broadband frequency correlation qualities of the radio channel.

The invention is characterized in a plurality of flexible delay modules B, where each module emulates one tap. The number of taps can, for instance, correspond to that of the COST 207-model (6 or 12). The delay module B consists of a delay line with a multiple of outputs realized in surface filter wave technology, for instance SAW (Surface Acoustic Wave). Each separate output has a specific delay, where the delay values are distributed over the delay span of the module. Respective output is equipped with a continuously variable attenuator, realized by means of a PIN-diode H, the attenuation of which is controlled by a control computer via a D/A-circuit (PIN here signifies Positive Intrinsic Negative). The signals from the attenuators H are added in an adder D and is passed to a fading module E which generates a flat fading of the signal. The fading module E is realized by DSP-technology, alternatively a computer controlled attenuator of PIN-diode type.

The input signal is coupled, via a computer controlled amplification regulator, for instance an AGC (Automatic Gain Control) to the delay modules B either parallell or it) series to attain longer delay. The output signals from the fading modules E are added in an adder G and are passed to a computer controlled amplifier F, which compensates for attenuation and current amplification adjustment of the input stage. The amplifier F is controlled by the control computer.

The invention is intended to be used at functional tests, system tests and type tests of terminal and network equipment for mobile communications systems with demands on realistic emulation of the time dispersion of the channels and broadband channel qualities (frequency correlation). Examples of such systems are GSM with frequency hopping or future broadband mobile telephone systems.

In the following, the function of the in the channel simulator included units will be described. The time dispersion of a channel is emulated according to a "tapped delay" model.

The delay module B causes the delay value of each tap which varies with time. The fading modules E attend to channel fading emulation for each separate tap. The fading modules E can be independent or coupled with a correlation coefficient. Fading characteristics can be controlled by means of a data program.

The change of the channel in time can be well described. The PIN-diode attenuators H can be used to change tap delay by attenuating the output from the delay unit which has given the time delay in question, at the same time as the attenuation is reduced for a new output which gives the new time delay. The transition between the discrete time delays is without interruption and is made with continuous changing of the attenuation adjustments, which imitates the behaviour of the mobile radio channel. During the time a tap maintain its time delay, the amplitude of the tap can be varied (by means of its PIN-diode attenuators) around the given average level, to imitate the shadow fading of the radio channel.

The influence on the frequency of the quick fading and the shadow fading, of the modelled mobile speed, and the speed variation of the time delay of the taps can be handled and, during current emulation, be varied by means of the control computer.

The above described is only to be regarded as an advantageous embodiment of the invention, and the extent of protection of the invention is only defined by what is indicated in the following patent claims.

What is claimed is:

1. A device for simulation of a radio channel in a mobile communications system, comprising:
at least two flexible delay modules each having an output and configured to emulate a tap;
a plurality of continuously variable attenuators each having an attenuation, each of the plurality of attenuators being associated with the outputs of the at least two delay modules and being configured to output a signal;
a control computer configured to control the attenuation of the plurality of attenuators;
an adder configured to add each signal from the plurality of attenuators; and
a fading module connected to the adder and configured to emulate channel fading for the at least two flexible delay modules.

2. The device according to claim 1, wherein each of said at least two delay modules emulate said tap with a same time delay.

3. The device according to claim 1, wherein said at least two delay modules are connected in series to attain increased time delay in one of said delay modules.

4. The device according to claim 1, wherein said at least two delay modules comprise a delay line with said outputs realized in surface wave filter technology.

5. The device according to claim 1, wherein said plurality of continuously variable attenuators are PIN-diodes.

6. The device according to claim 1, wherein said fading module is realized in one of DSP-technology and a computer controlled attenuator.

7. The device according to claim 6, wherein said adder is connected to an output via a computer controlled amplifier.

8. The device according to claim 7, wherein said computer controlled amplifier is configured to compensate for attenuation and amplification adjustment of an input stage.

9. A method for simulation of a radio channel in a mobile communications system, comprising:
emulating said radio channel using a tap delay module having a time delay;
realizing the time delay by means of a delay module having an amplitude;
emulating a fading of said radio channel for each delay module using a fading module having fading characteristics;
controlling said fading characteristics using a data program; and
emulating a shadow fading of the radio channel by varying the amplitude of the delay module during the time the delay module maintains the time delay,
wherein during the time said tap maintains the time delay, the amplitude of said tap is varied by an attenuator to emulate the shadow fading of the radio channel.

10. The method according to claim 9, wherein said attenuator is utilized to change a tap delay by attenuating an output from said delay module which has given a time delay.

11. The method according to claim 10, wherein a transition between discrete time delays is without interruption and is made by a continuous change of attenuator adjustments by the attenuators, said continuous change emulating a behaviour of the mobile radio channel.

12. The method according to claim 10, wherein a transition between discrete time delays is without interruption and is made by continuous change of attenuator adjustments by means of the attenuators, said continuous change emulating a behavior of the mobile radio channel.

* * * * *